(12) United States Patent
Tagawa et al.

(10) Patent No.: US 11,379,167 B2
(45) Date of Patent: Jul. 5, 2022

(54) NON-TRANSITORY COMPUTER-READABLE RECORDING MEDIUM STORING COMPUTER-READABLE INSTRUCTIONS FOR TERMINAL DEVICE, METHOD EXECUTED BY TERMINAL DEVICE, AND TERMINAL DEVICE FOR CAUSING THE PRINTER TO EXECUTE RESTRICTED PRINTING

(71) Applicant: BROTHER KOGYO KABUSHIKI KAISHA, Nagoya (JP)

(72) Inventors: Shinya Tagawa, Nagoya (JP); Munehisa Matsuda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 253 days.

(21) Appl. No.: 16/789,557

(22) Filed: Feb. 13, 2020

(65) Prior Publication Data
US 2020/0272378 A1 Aug. 27, 2020

(30) Foreign Application Priority Data
Feb. 22, 2019 (JP) .............................. JP2019-030533

(51) Int. Cl.
G06F 3/12 (2006.01)
H04L 29/06 (2006.01)
H04L 69/16 (2022.01)

(52) U.S. Cl.
CPC .......... *G06F 3/1222* (2013.01); *G06F 3/1238* (2013.01); *H04L 69/16* (2013.01)

(58) Field of Classification Search
None
See application file for complete search history.

(56) References Cited

U.S. PATENT DOCUMENTS 7,738,133 B2 * 6/2010 Inakawa ................ G06K 15/00
358/1.16
7,855,795 B2 * 12/2010 Ueda .................... H04N 1/4446
358/1.14

(Continued)

FOREIGN PATENT DOCUMENTS

JP 2016-072785 A 5/2016

OTHER PUBLICATIONS

IPP Privacy Attributes v1.0 (Privacy), The Printer Working Group, Apr. 12, 2018, pp. 1-16.

*Primary Examiner* — Thomas D Lee
(74) *Attorney, Agent, or Firm* — Scully, Scott, Murphy & Presser, PC

(57) ABSTRACT

A terminal device may display a designation screen on a display unit, store designation item information indicating a designation item in a memory, and send a restriction item request to a target printer. The terminal device may, in a case where the restriction item request is sent to the target printer, receive the restriction item information from the target printer, and determine whether the restriction item indicated by the received restriction item information includes the designation item indicated by the designation item information stored in the memory. The terminal device may, in a case where it is determined that the restriction item includes the designation item, send a print request that requests execution of printing according to the IPP to the target printer, wherein in a case where it is determined that the restriction item does not include the designation item, the print request is not sent.

19 Claims, 11 Drawing Sheets

(56) References Cited

U.S. PATENT DOCUMENTS

2010/0149580 A1\* 6/2010 Iizuka ................... G06F 3/1239
358/1.14
2016/0094727 A1 3/2016 Sawada
2016/0179443 A1\* 6/2016 Saito ..................... G06F 3/1209
358/1.14

\* cited by examiner

FIG. 7 (Case A: Print Process)

(Second Embodiment)

NON-TRANSITORY COMPUTER-READABLE RECORDING MEDIUM STORING COMPUTER-READABLE INSTRUCTIONS FOR TERMINAL DEVICE, METHOD EXECUTED BY TERMINAL DEVICE, AND TERMINAL DEVICE FOR CAUSING THE PRINTER TO EXECUTE RESTRICTED PRINTING

CROSS-REFERENCE TO RELATED APPLICATION

This application claims priority to Japanese Patent Application No. 2019-030533, filed on Feb. 22, 2019, the entire contents of which are hereby incorporated by reference into the present application.

TECHNICAL FIELD

The disclosure herein discloses a technique related to a terminal device configured to cause a printer to execute printing according to an Internet Printing Protocol (IPP).

BACKGROUND ART

A technique in which a printer receives print data from a terminal device and executes printing according to the IPP is known.

In response to executing printing, the printer normally stores print history information including information related to the printing (such as a job name and print settings). "IPP Privacy Attributes v.1.0" describes a technique that sets, in a printer, an item of which disclosure to a user other than a disclosure target user is restricted (hereinbelow termed "restriction item"), which is among a plurality of items corresponding to the print history information, and discloses information corresponding to the restriction item only to the disclosure target user. Due to this, for example, in a case where a user who caused the printer to execute printing (hereinbelow termed "print executing user") is set as the disclosure target user, it can be prevented that the information corresponding to the restriction item is acquired by a user other than the print executing user.

SUMMARY

However, there may be a situation in which the print executing user may cause the printer to execute printing without knowing a restriction item set in the printer. In such a situation, if an item on which the print executing user wishes to put a disclosure restriction is not stored as a restriction item in the printer, information corresponding to this item could be acquired by a user other than the disclosure target user.

The disclosure herein discloses a technique that can prevent a user other than a disclosure target user from acquiring information corresponding to an item on which a user of a terminal device wishes to put disclosure restriction.

The disclosure herein discloses a non-transitory computer-readable recording medium storing computer-readable instructions for a terminal device. The computer-readable instructions, when executed by a processor of the terminal device, may cause the terminal device to: display a designation screen on a display unit of the terminal device; store designation item information indicating a designation item in a memory of the terminal device, wherein the designation item is an item that is designated by a user of the terminal device on the displayed designation screen from among a plurality of items corresponding to print history information, and the print history information is information that is stored in a target printer in response to printing according to an Internet Printing Protocol (IPP) being executed in the target printer; send a restriction item request to the target printer, wherein the restriction item request is according to the IPP and requests sending of restriction item information indicating a restriction item, and the restriction item is among the plurality of items corresponding to the print history information and is stored in the target printer as an item of which disclosure to a user other than a disclosure target user is restricted; in a case where the restriction item request is sent to the target printer, receive the restriction item information from the target printer; determine whether the restriction item indicated by the received restriction item information includes the designation item indicated by the designation item information stored in the memory; and in a case where it is determined that the restriction item includes the designation item, send a print request that requests execution of printing according to the IPP to the target printer, wherein in a case where it is determined that the restriction item does not include the designation item, the print request is not sent, wherein in the target printer, in a case where the print request is received from the terminal device, the printing according to the IPP is executed and the print history information is stored, and in the target printer, the printing according to the IPP is not executed and the print history information is not stored due to the print request being not sent from the terminal device.

A computer program for realizing the aforementioned terminal device is also novel and useful. The aforementioned terminal device and a control method for realizing the terminal device are also novel and useful. Further, a communication system that comprises the aforementioned terminal device and the printer is also novel and useful.

EMBODIMENTS

First Embodiment; FIGS. 1 to 9

Figure 1:
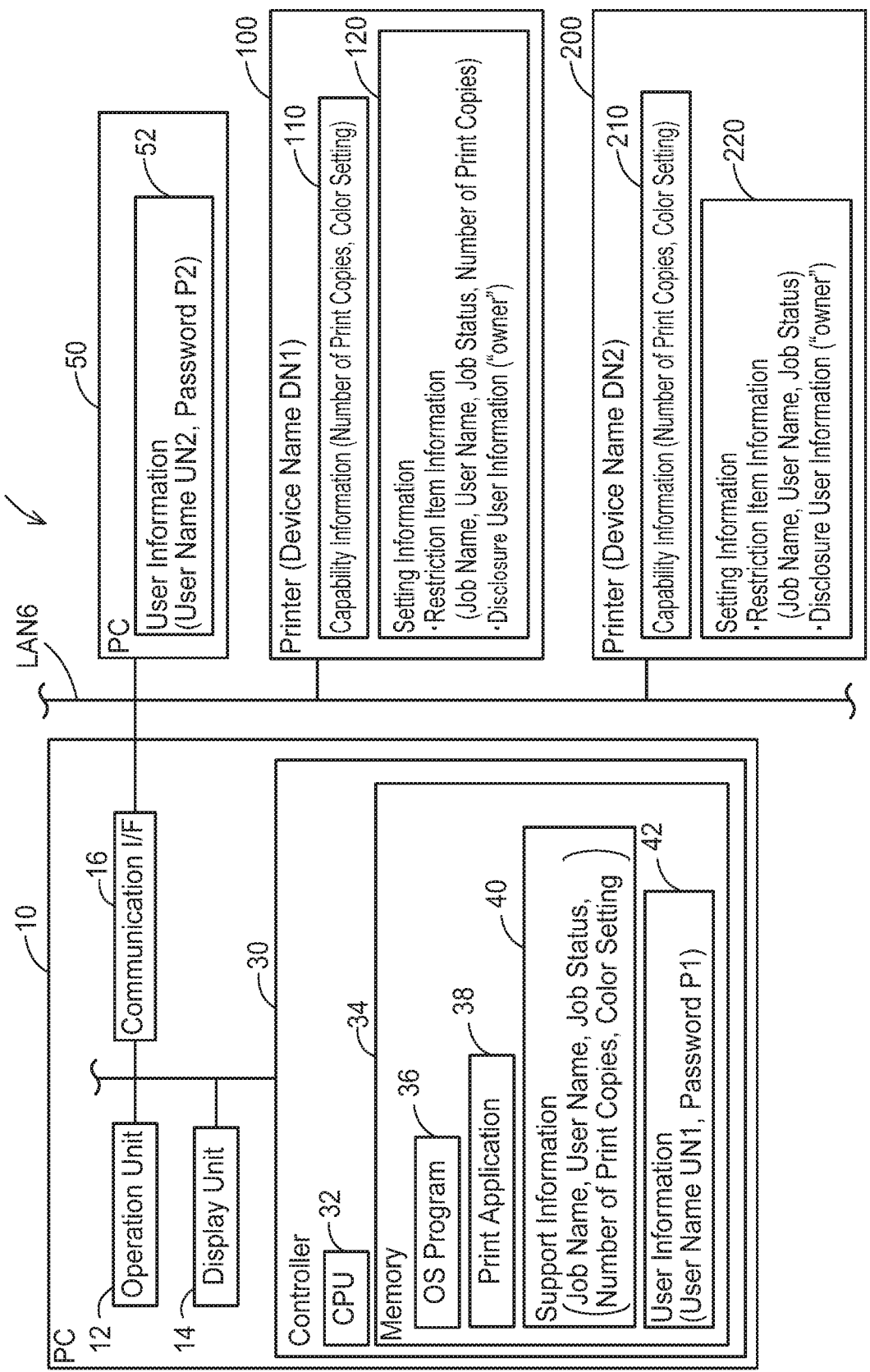
FIG. 1 shows a configuration of a communication system.

(Configuration of Communication System 2; FIG. 1)
As shown in FIG. 1, a communication system 2 is provided with a plurality of personal computers (PCs) 10, 50 and a plurality of printers 100, 200. These devices 10, 50, 100, 200 are configured to be capable of communicating with each other through a Local Area Network (LAN) 6. The LAN 6 may be a wired LAN or a wireless LAN.

(Configurations of PCs 10, 50)

The PCs 10, 50 are stationary PCs, however, they may be portable devices such as notebook PCs in a variant. The present embodiment assumes a situation in which the PCs 10, 50 are used by different users. The PCs 10, 50 have the same configuration. As such, hereinbelow, description for the configuration of the PC 50 will be omitted and only the configuration of the PC 10 will be described. The PC 10 is provided with an operation unit 12, a display unit 14, a communication interface 16, and a controller 30. The respective units 12 to 30 are connected to a bus line (reference sign omitted). Hereinbelow, an interface will be denoted "I/F".

The operation unit 12 is provided with a plurality of keys. The user can give various instructions to the PC 10 by operating the operation unit 12. The display unit 14 is a display configured to display various types of information. The display unit 14 may function as a so-called touch panel (that is, an operation unit). The communication I/F 16 is connected to the LAN 6.

The controller 30 is provided with a CPU 32 and a memory 34. The CPU 32 is a processor configured to execute various processes according to an Operating System (OS) program 36 stored in the memory 34. The memory 34 is constituted of a ROM, a RAM and the like. The memory 34 further stores a print application (hereinbelow simply termed "app") 38, support information 40, and user information 42, in addition to the aforementioned OS program 36.

The app 38 is an application for instructing the printers 100, 200 to execute printing by following a procedure according to an IPP. The app 38 may, for example, be installed in the PC 10 from a server provided by a vendor of the printers 100, 200 on the Internet, or may be installed in the PC 10 from media shipped together with the printers 100, 200.

The IPP is a standard technique that realizes a printer to execute printing through a TCP/IP network such as the Internet, and defines a communication procedure (that is, a protocol) for remotely causing a printer to execute printing. Standard specifications of the IPP have been established by Printer Working Group (PWG), which is a working group of the Internet Engineering Task Force (IETF) that is dedicated to the printing field. In the IPP, information are regarded as objects and types of objects are defined by attributes. For example, in a case where a print job according to the IPP is executed in a printer, a type of object corresponding to print history information stored in this printer is defined by an attribute "job-object".

The support information 40 indicates a plurality of items that correspond to print history information and are supported (that is, interpretable) by the PC 10. In the present embodiment, the plurality of items includes an item "job name" corresponding to a job name which is a name of a print job, an item "user name" corresponding to a user name which is a name of a user who instructed execution of printing (hereinbelow simply termed "print executing user"), an item "job status" corresponding to a job status which indicates an execution status of print job, an item "number of print copies" corresponding to a number of print copies used in printing, and an item "color setting" corresponding to a color setting used in printing. In a variant, the plurality of items indicated by the support information 40 may not be limited to the aforementioned items, and may include only some of the aforementioned items or may include other items corresponding to information with the job-object attribute (such as a Uniform Resource Identifier (URI) indicating a storage location of image data). The items "job name", "user name", and "job status" are items that are defined as Required in Request For Comments (RFC) 8011 and supported by printers capable of executing printing by following the procedure according to the IPP. On the other hand, the items "number of print copies" and "color setting" are items that are not defined as Required in the RFC 8011 and might not be supported by printers capable of executing printing by following the procedure according to the IPP.

The user information 42 includes a user name UN1 and a password P1 for a user of the PC 10 (hereinbelow simply termed "first user") to log in to the PC 10. The PC 50 stores user information 52, instead of the user information 42. The user information 52 includes a user name UN2 and a password P2 for a user of the PC 50 (hereinbelow simply termed "second user") to log in to the PC 50.

(Configurations of Printers 100, 200)

The printers 100, 200 are peripherals (that is, peripherals of the PCs 10, 50) configured to be capable of executing a print function. Each of the printers 100, 200 may be a multifunction device configured to be capable of executing a scan function and a FAX function in addition to the print function. The printer 100 has a device name DN1. The printer 200 has a device name DN2 which is different from the device name DN1 of the printer 100.

The printer 100 stores capability information 110 and setting information 120. The capability information 110 indicates one or more items that correspond to print settings supported by the printer 100, that is, one or more items which the printer 100 is capable of using (hereinbelow simply termed "usable items"). In the present embodiment, the capability information 110 indicates a usable item "number of print copies" and a usable item "color setting". That is, the printer 100 is capable of printing at least one copy and is also capable of executing color print and monochrome print. In a variant, the capability information 110 may include items corresponding to other print settings (such as double-side print).

The setting information 120 is information that is stored in a memory (not shown) of the printer 100, for example, by an administrator of the printer 100 and includes restriction item information and disclosure user information. The restriction item information indicates one or more items of which disclosure to a person other than a disclosure target user is restricted (hereinbelow simply termed "restriction items") among the print history information, that is, one or more private items. An attribute of the restriction items is a job-privacy attribute. In the example of FIG. 1, the restriction item information of the printer 100 indicates a restriction item "job name", a restriction item "user name", a restriction item "job status", and a restriction item "number of print copies". The disclosure user information indicates the disclosure target user of the restriction items and has a job-privacy-scope attribute as its attribute. The disclosure user information indicates one of "all", "default", "owner", and "none". The disclosure user information indicating "all" indicates that the disclosure target user includes all users who are capable of using the printer 100. The disclosure user information indicating "default" indicates the disclosure target user is a user who is predetermined by the vendor of the printer 100, and in this embodiment, the disclosure user information indicating "default" indicates that the disclosure target user includes the print executing user and the administrator of the printer 100. The disclosure user information indicating "owner" indicates that the disclosure target user is only the print executing user. The disclosure user information indicating "none" indicates that there is no disclosure target user. In the example of FIG. 1, the disclosure user information of the printer 100 indicates "owner".

The printer 200 stores capability information 210 and setting information 220. The capability information 210 indicates a usable item "number of print copies" and a usable item "color setting". Further, restriction item information included in the setting information 220 indicates a restriction item "job name", a restriction item "user name", and a restriction item "job status". Disclosure user information included in the setting information 220 indicates "owner".

Here, for example, a situation is assumed in which an item on which the first user wishes to put disclosure restriction is the item "number of print copies" and the first user does not know the restriction items stored in each of the printers 100, 200. In this case, if the first user causes the printer 200 to execute printing, the print history information corresponding to the item "number of print copies" could be acquired by a user other than the first user because the item "number of print copies" on which the first user wishes to put disclosure restriction is not stored in the printer 200 as a restriction item. The present embodiment realizes preventing the print history information corresponding to an item on which the first user wishes to put disclosure restriction from being acquired by a user other than the first user by causing a printer (such as 100) that stores the item on which the first user wishes to put disclosure restriction as a restriction item to execute printing.

Figure 2:
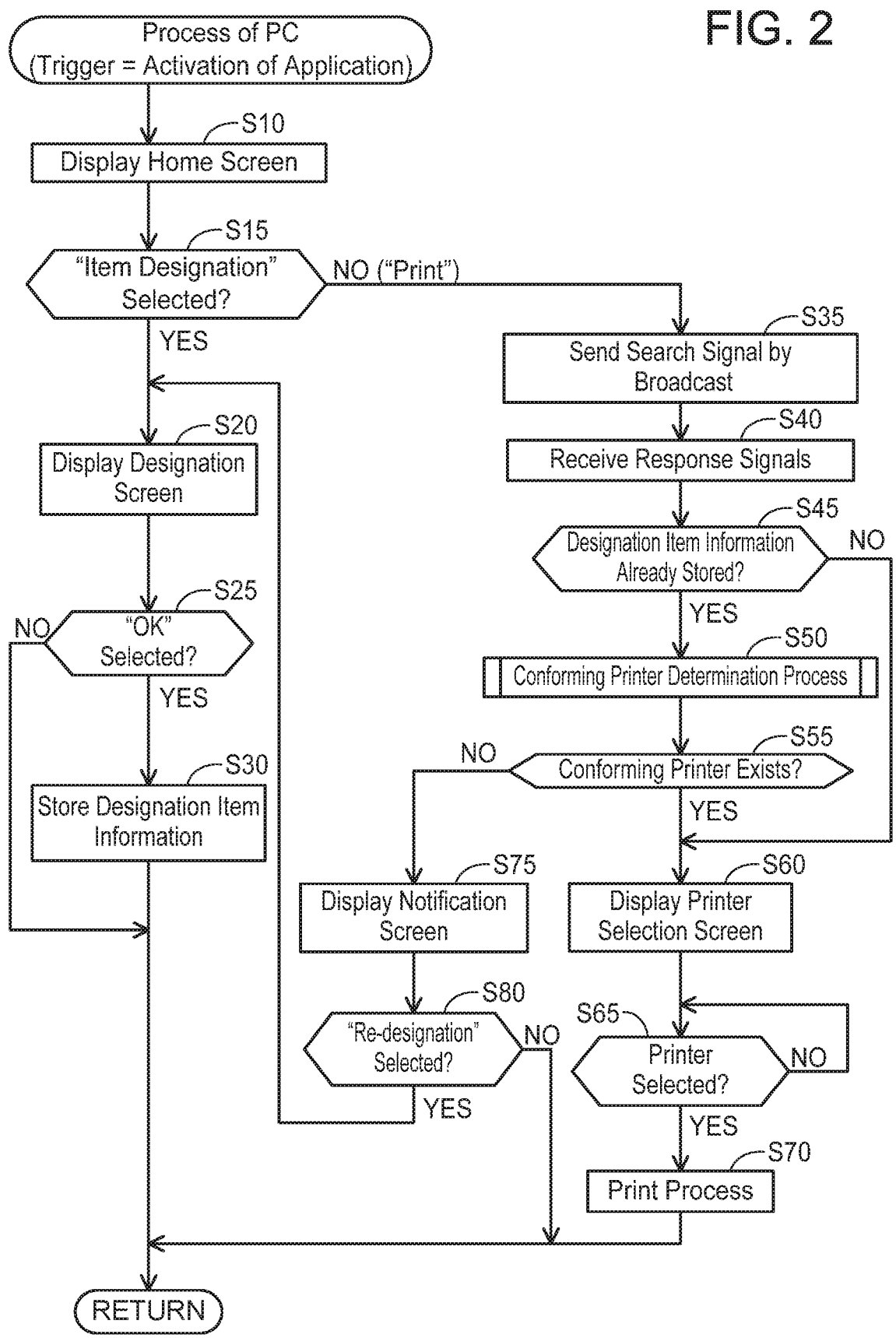
FIG. 2 shows a flowchart of a process executed by a PC.

(Process of PC 10; FIG. 2)

Next, a process which the CPU 32 of the PC 10 executes according to the app 38 will be described with reference to FIG. 2. The process of FIG. 2 is executed when the first user logs in to the PC 10 and activates the app 38. The PC 10 executes the process of FIG. 2 according to the app 38. As such, hereinbelow, a phrase "according to the app 38" will be omitted. Further, the PC 10 executes communication via the communication I/F 16. As such, hereinbelow, a phrase "via the communication I/F 16" will be omitted.

In S10, the CPU 32 displays a home screen on the display unit 14. The home screen is a screen that is displayed when the CPU 32 is not executing processes of S20 to S70 (to be described later) according to the app 38, thus in other words, the home screen is a default screen. The home screen includes an item designation button for designating item(s) on which the first user wishes to put disclosure restriction, and a print button for causing a printer to execute printing.

In S15, the CPU 32 determines whether or not the item designation button is selected in the home screen. In a case where the item designation button in the home screen is selected by the first user, the CPU 32 determines YES in S15 and proceeds to S20. On the other hand, in a case where the print button in the home screen is selected by the first user, the CPU 32 determines NO in S15 and proceeds to S35.

In S20, the CPU 32 displays a designation screen on the display unit 14. Specifically, the CPU 32 firstly identifies the five items indicated by the support information 40 stored in the memory 34 (that is, the job name, the user name, the job status, the number of print copies, and the color setting). Then, the CPU 32 displays, on the display unit 14, the designation screen that includes names of the identified five items, five checkboxes for designating the five items, an OK button, and a Cancel button. Here, for example, a comparative example is assumed in which an input screen that includes an input box to which an item on which the first user wishes to put disclosure restriction is inputted. In this case, if the user has poor knowledge on the IPP, the user may have difficulty in inputting the name of an item (such as the job name) defined by the IPP. In the present embodiment, since the designation screen including the names of the five items and the five checkboxes is displayed on the PC 10, the first user can easily designate item(s) that are defined by the IPP and are supported by the PC 10 by selecting the checkbox(es) in the designation screen. User convenience is thereby improved. In a variant, the configuration of the comparative example may be employed.

In S25, the CPU 32 determines whether or not one or more checkboxes are selected by the first user from the five checkboxes in the designation screen and the OK button in the designation screen is selected by the first user. In a case where one or more checkboxes are selected from the five checkboxes in the designation screen and the OK button in the designation screen is selected by the first user, the CPU 32 determines YES in S25 and proceeds to S30. On the other hand, in a case where the Cancel button in the designation screen is selected by the first user, the CPU 32 determines NO in S25 and returns to S10.

In S30, the CPU 32 stores, in the memory 34, designation item information that indicates the one or more items corresponding to the one or more checkboxes selected in S25 (hereinbelow simply termed "designation items"). When the process of S30 is completed, the CPU 32 returns to S10.

In S35, the CPU 32 broadcasts a search signal for searching printers that are present around the PC 10 according to multicast Domain Name System (mDNS).

In S40, the CPU 32 receives a response signal, which is a response to the search signal, from each of one or more printers present around the PC 10. Each response signal includes a device name of the printer which is the sender of the response signal (hereinbelow, a printer which is a sender of a signal will be termed a sender printer).

In S45, the CPU 32 determines whether or not the designation item information is already stored in the memory 34. In a case where the designation item information is already stored in the memory 34, that is, in a case where the process of S30 has been executed, the CPU 32 determines YES in S45 and proceeds to S50. On the other hand, in a case where the designation item information has not been stored yet in the memory 34, that is, in a case where the process of S30 has not been executed, the CPU 32 determines NO in S45 and proceeds to S60.

In S50, the CPU 32 executes a conforming printer determination process. In the conforming printer determination process, the CPU 32 determines whether each of the one or more sender printers of the response signals is a "conforming printer" or a "non-conforming printer". A conforming printer is a printer that stores the designation item(s) indicated by the designation item information stored in the memory 34 as the restriction item(s). A non-conforming printer is a printer that does not store the designation item(s) indicated by the designation item information stored in the memory 34 as the restriction item(s).

In S55, the CPU 32 determines whether or not there is a printer determined as the conforming printer in the conforming printer determination process of S50. In a case where there is a printer determined as the conforming printer in S50, the CPU 32 determines YES in S55 and proceeds to S60. On the other hand, in a case where there is no printer determined as the conforming printer in S50, the CPU 32 determines NO in S55 and proceeds to S75.

In S75, the CPU 32 displays on the display unit 14 a notification screen for notifying that there is no conforming printer. Due to this, the first user can be aware that there is no conforming printer. The notification screen includes a re-designation button for redisplaying the designation screen and a Cancel button.

In S80, the CPU 32 determines whether or not the re-designation button is selected in the notification screen. In a case where the re-designation button in the notification screen is selected by the first user, the CPU 32 determines YES in S80 and redisplays the designation screen on the display unit 14 in S20. On the other hand, in a case where the Cancel button in the notification screen is selected by the first user, the CPU 32 determines NO in S80 and returns to S10.

In S60, the CPU 32 displays on the display unit 14 a printer selection screen for selecting a printer to execute printing. In S60 that is executed after the determination NO in S45, the CPU 32 displays on the display unit 14 a printer selection screen that allows selection of any of the device names of the one or more sender printers of the response signals. On the other hand, in S60 that is executed after the determining YES in S45, the CPU 32 displays on the display unit 14 a printer selection screen that allows selection of the device name of the printer determined as the conforming printer in S50 but does not allow selection of the device name of the printer determined as the non-conforming printer in S50. Specifically, the CPU 32 displays the device name(s) of the printer(s) determined as the non-conforming printer in S50 in gray-out. In a variant, the CPU 32 may display on the display unit 14 a printer selection screen that does not include the device name(s) of the printer(s) determined as the non-conforming printer in S50.

In S65, the CPU 32 determines whether or not a device name is selected in the printer selection screen. In a case where one device name in the printer selection screen is selected by the first user, the CPU 32 determines YES in S65 and proceeds to S70.

In S70, the CPU 32 executes communication with the printer having the device name selected in S65 to cause this printer to execute printing according to the IPP, and causes the printer to execute the printing according to the IPP. When the process of S70 is completed, the CPU 32 returns to S10.

Figure 3:
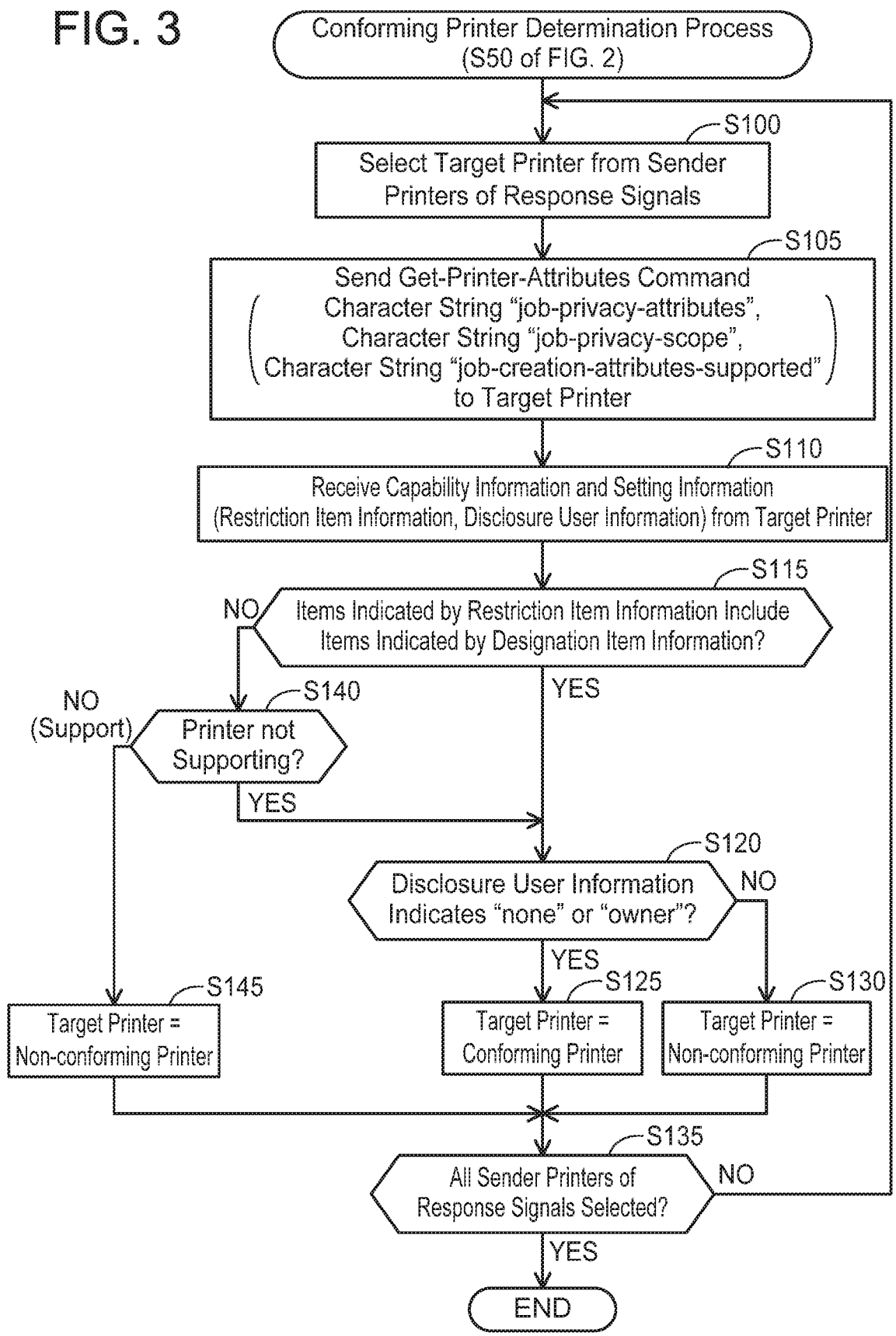
FIG. 3 shows a flowchart of a conforming printer determination process.

(Conforming Printer Determination Process; FIG. 3)

Next, details of the conforming printer determination process executed in S50 of FIG. 2 will be described with reference to FIG. 3. In S100, the CPU 32 selects one target printer from among the one or more sender printers of the response signals received in S40.

In S105, the CPU 32 sends a Get-Printer-Attributes command according to the IPP (hereinbelow simply termed "GPA command") to the target printer. The GPA command includes a character string "job-privacy-attributes", a character string "job-privacy-scope", and a character string "job-creation-attributes-supported". The character string "job-privacy-attributes" indicates a request for sending of information having the "job-privacy" attribute as its attribute. That is, the GPA command including the character string "job-privacy-attributes" is a command that requests sending of the restriction item information. The character string "job-privacy-scope" indicates a request for sending of information having the job-privacy-scope attribute as its attribute. That is, the GPA command including the character string "job-privacy-scope" is a command that requests sending of the disclosure user information. The character string "job-creation-attributes-supported" indicates a request for sending of the capability information. That is, the GPA command including the character string "job-creation-attributes-supported" is a command that requests sending of the capability information.

In S110, the CPU 32 receives the capability information and the setting information of the target printer from the target printer. This setting information includes the restriction item information and the disclosure user information.

In S115, the CPU 32 determines whether or not restriction items that are indicated by the restriction item information in the setting information received in S110 include the designation items indicated by the designation item information stored in the memory 34. In a case of determining that the restriction items include the designation items (YES in S115), the CPU 32 determines that the target printer stores the designation items as the restriction items and proceeds to S120. On the other hand, in a case of determining that the restriction items do not include the designation items (NO in S115), the CPU 32 determines that the target printer does not store the designation items as the restriction items and proceeds to S140.

In S140, the CPU 32 determines whether or not usable items indicated by the capability information received in S110 include the designation item corresponding to the print setting (such as the number of print copies) among the designation items indicated by the designation item information stored in the memory 34. In a case of determining that the usable items include the designation item corresponding to the print setting (NO in S140), the CPU 32 determines that the target printer supports the print setting corresponding to the designation item, determines the target printer as the non-conforming printer in S145, and proceeds to S135. On the other hand, in a case of determining that the usable items do not include the designation item corresponding to the print setting (YES in S140), the CPU 32 determines that the target printer does not support the print setting corresponding to the designation item and proceeds to S120. In the situation where the target printer does not support the print setting corresponding to the designation item, the print setting corresponding to the designation item will not be stored in the target printer. As such, the print setting will not be acquired by a user other than the disclosure target user. Since the CPU 32 does not determine the target printer as the non-conforming printer under such a situation, the conforming printer can suitably be selected.

In S120, the CPU 32 determines whether or not the disclosure user information in the setting information received in S110 indicates "none" or "owner". In a case where the disclosure user information indicates "none" or "owner", the CPU 32 determines YES in S120 and determines the target printer as the conforming printer in S125. On the other hand, in a case where the disclosure user information indicates "all" or "default", the CPU 32 determines NO in S120 and determines the target printer as the non-conforming printer in S130. Due to this, in the printer selection screen displayed in S60 of FIG. 2, this target printer cannot be selected. As such, since printing is not executed by the target printer in the situation where the disclosure user information of the target printer indicates "all" or "default", that is, in a situation where the print history information corresponding to the restriction item could be acquired by a user other than the print executing user, the print history information corresponding to the restriction item can be prevented from being acquired by a user other than the print executing user.

In S135, the CPU 32 determines whether or not all of the one or more sender printers of the response signals received in S40 of FIG. 2 have been selected as the target printer. In a case of determining that not all of the one or more printers have been selected (NO in S135), the CPU 32 selects an unselected printer as the target printer in S100. On the other hand, in a case of determining that all of the one or more printers have been selected (YES in S135), the CPU 32 terminates the process of FIG. 3.

Specific Examples; FIGS. 4 to 9

Next, specific examples realized by the CPU 32 of the PC 10 executing the processes of FIGS. 2 and 3 will be described with reference to FIGS. 4 to 9. Hereinbelow, for easier understanding, actions executed by the CPUs of the respective devices (such as the CPU 32 of the PC 10) will be described with the respective devices (such as the PC 10) as subjects of the actions, instead of describing the actions with the CPUs as the subjects of actions.

(Case A; FIGS. 4 to 8)

Figure 4:
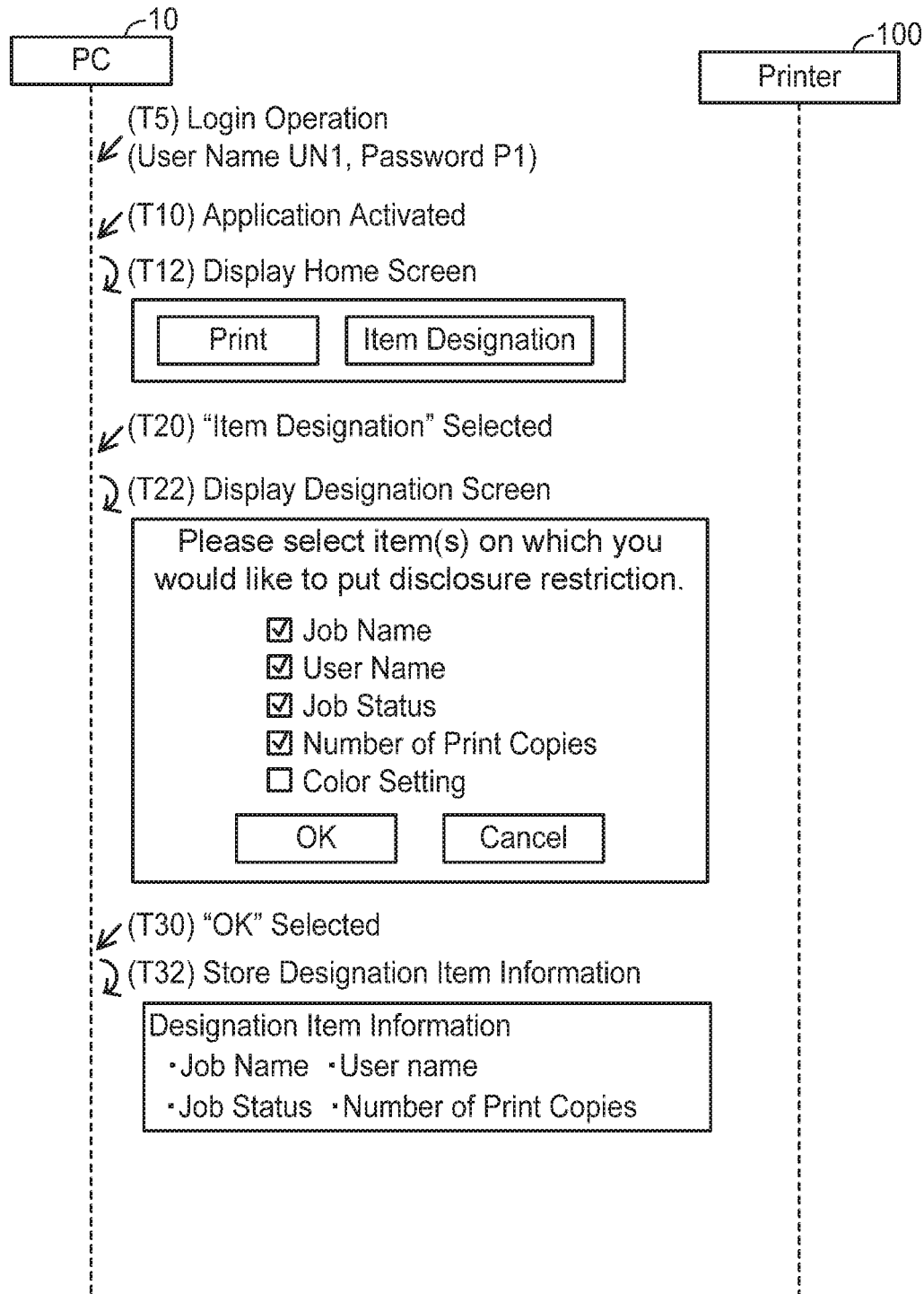
FIG. 4 is a sequence diagram of an item designation process of Case A.

Firstly, Case A in which there is a printer determined as the conforming printer in the conforming printer determination process (see FIG. 3) will be described with reference to FIGS. 4 to 8. FIG. 4 shows an item designation process for the PC 10 to store the designation item information.

The PC 10 accepts a login operation including input of the user name UN1 and the password P1 from the first user in T5, accepts an app activating operation for activating the app 38 in T10, and activates the app 38. In this case, the PC 10 displays the home screen on the display unit 14 in T12 (S10 of FIG. 2).

When the item designation button in the home screen is selected by the first user in T20 (YES in 815 of FIG. 2), the PC 10 displays the designation screen on the display unit 14 in T22 (820).

In T30, the first user selects four checkboxes corresponding to four item names (that is, the job name, the user name, the job status, and the number of print copies) among the five item names in the designation screen (that is, the job name, the user name, the job status, the number of print copies, and the color setting), and selects the OK button (YES in S25 of FIG. 2). In this case, in T32, the PC 10 stores in the memory 34 the designation item information that indicates the four designation items (that is, the job name, the user name, the job status, and the number of print copies) corresponding to the selected four checkboxes (S30). When the process of T32 is completed, the process of FIG. 4 is terminated.

Figure 5:
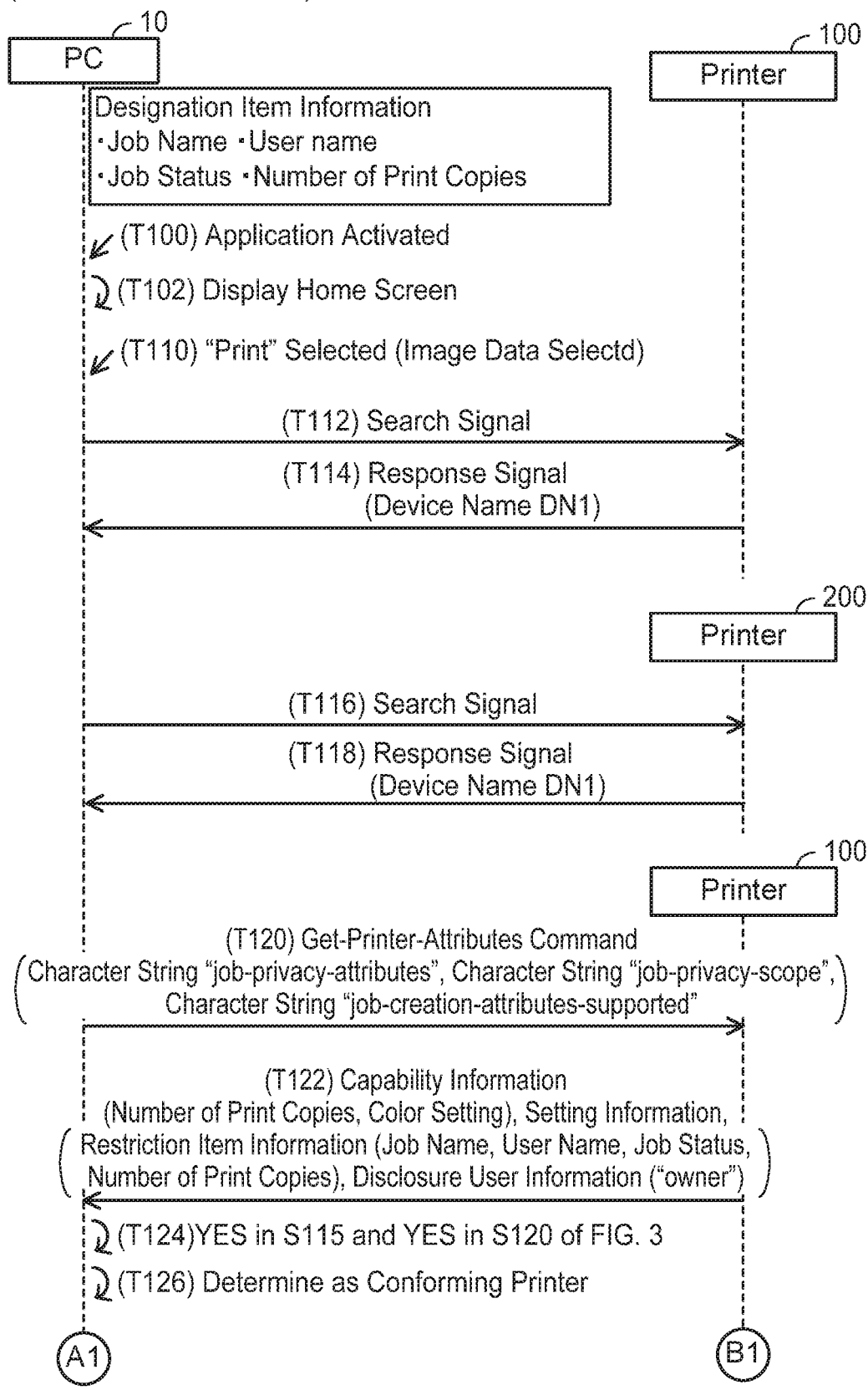
FIG. 5 is a sequence diagram of a print process of Case A.

(Print Process; FIG. 5)

Next, a print process of Case A will be described with reference to FIG. 5. FIG. 5 assumes a state after the process of FIG. 4 has been executed. As such, in an initial state of FIG. 5, the PC 10 already stores the designation item information indicating the four designation items (that is, the job name, the user name, the job status, and the number of print copies).

T100 and T102 are the same as T10 and T12 of FIG. 4. When the print button in the home screen is selected and image data, which is a print target, is selected by the first user in T110 (NO in S15 of FIG. 2), the PC 10 broadcasts the search signal according to the mDNS (S35). In this case, in response to the search signal being received by the printer 100 in T112, the PC 10 receives a response signal that includes the device name DN1 of the printer 100 from the printer 100 in T114 (S40). Further, in response to the search signal being received by the printer 200 in T116, the PC 10 receives a response signal that includes the device name DN2 of the printer 200 from the printer 200 in T118 (S40). In this case, the PC 10 determines that the designation item information is already stored in the memory 34 (YES in S45) and executes the conforming printer determination process (S50).

Firstly, the PC 10 selects the printer 100 as the target printer from among the two sender printers 100, 200 of the response signals (S100 of FIG. 3). Then, the PC 10 sends, to the printer 100 in T120, the GPA command including the character string "job-privacy-attributes", the character string "job-privacy-scope", and the character string "job-creation-attributes-supported" (S105), and receives the capability information and setting information of the printer 100 from the printer 100 in T122 (S110). The capability information of the printer 100 indicates two usable items (that is, the number of print copies and the color setting). Further, the setting information of the printer 100 includes the restriction item information indicating four restriction items (that is, the job name, the user name, the job status, and the number of print copies) and the disclosure user information indicating "owner".

In T124, the PC 10 determines that the four restriction items (that is, the job name, the user name, the job status, and the number of print copies) indicated by the restriction item information in the received setting information include the four designation items (that is, the job name, the user name, the job status, and the number of print copies) indicated by the designation item information stored in the memory 34 (YES in S115 of FIG. 3). Further, the PC 10 determines that the disclosure user information in the received setting information indicates "owner" (YES in S120). In this case, the PC 10 determines the printer 100 as the conforming printer in T126 (S125). When the process of T126 is completed, the process of FIG. 5 is terminated.

Figure 6:
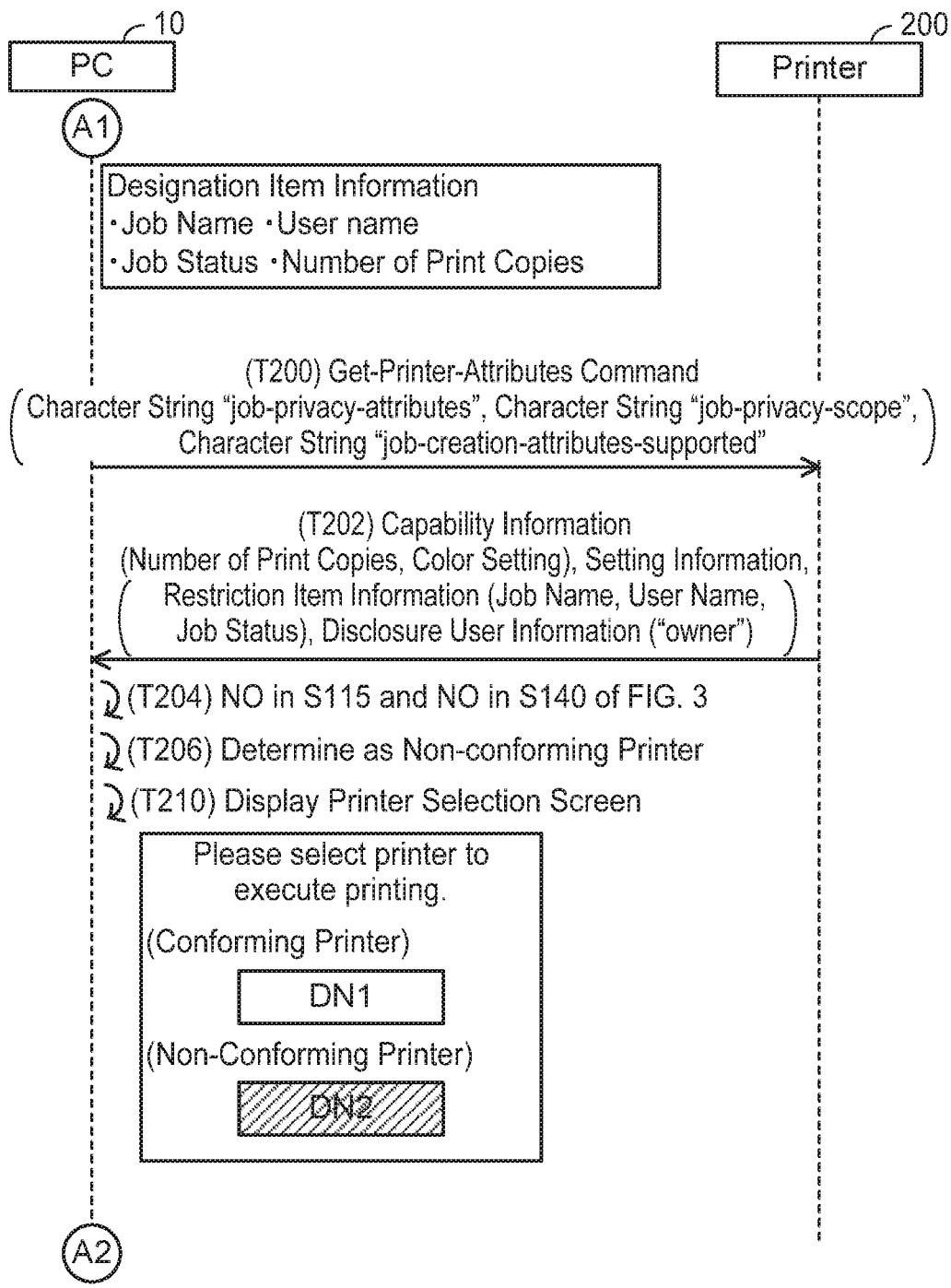
FIG. 6 is a continued sequence diagram of FIG. 5.

(Continuation of FIG. 5; FIG. 6)

Next, continuation of the process of FIG. 5 will be described with reference to FIG. 6. After having determined the printer 100 as the conforming printer in T126 of FIG. 5, the PC 10 determines that the sender printer 200 of the response signal has not been selected as the target printer (NO in S135 of FIG. 3) and selects the printer 200 as the target printer (S100).

T200 and T202 are the same as T120 and T122 of FIG. 5, except that the communication counterpart is the printer 200 and the capability information and the setting information of the printer 200 are used. The capability information of the printer 200 indicates two usable items (that is, the number of print copies and the color setting). Further, the setting information of the printer 200 includes the restriction item information indicating three restriction items (that is, the job name, the user name, and the job status) and the disclosure user information indicating "owner".

In T204, the PC 10 determines that the three restriction items (that is, the job name, the user name, and the job status) indicated by the restriction item information in the received setting information do not include the four designation items (that is, the job name, the user name, the job status, and the number of print copies) indicated by the designation item information stored in the memory 34 (NO in S115 of FIG. 3). Further, the PC 10 determines that the two usable items (that is, the number of print copies and the color setting) indicated by the received capability information include the designation item "number of print copies" corresponding to print setting (NO in S140). In this case, the PC 10 determines the printer 200 as the non-conforming printer in T206 (S145). Further, the PC 10 determines that the two sender printers 100, 200 of the response signals have been selected as the target printer (YES in S135).

In T210, the PC 10 displays on the display unit 14 the printer selection screen that allows selection of the device name DN1 of the printer 100 which was determined as the conforming printer but does not allow selection of the device name DN2 of the printer 200 which was determined as the non-conforming printer (S60 of FIG. 2). When the process of T210 is completed, the process of FIG. 6 is terminated.

Figure 7:
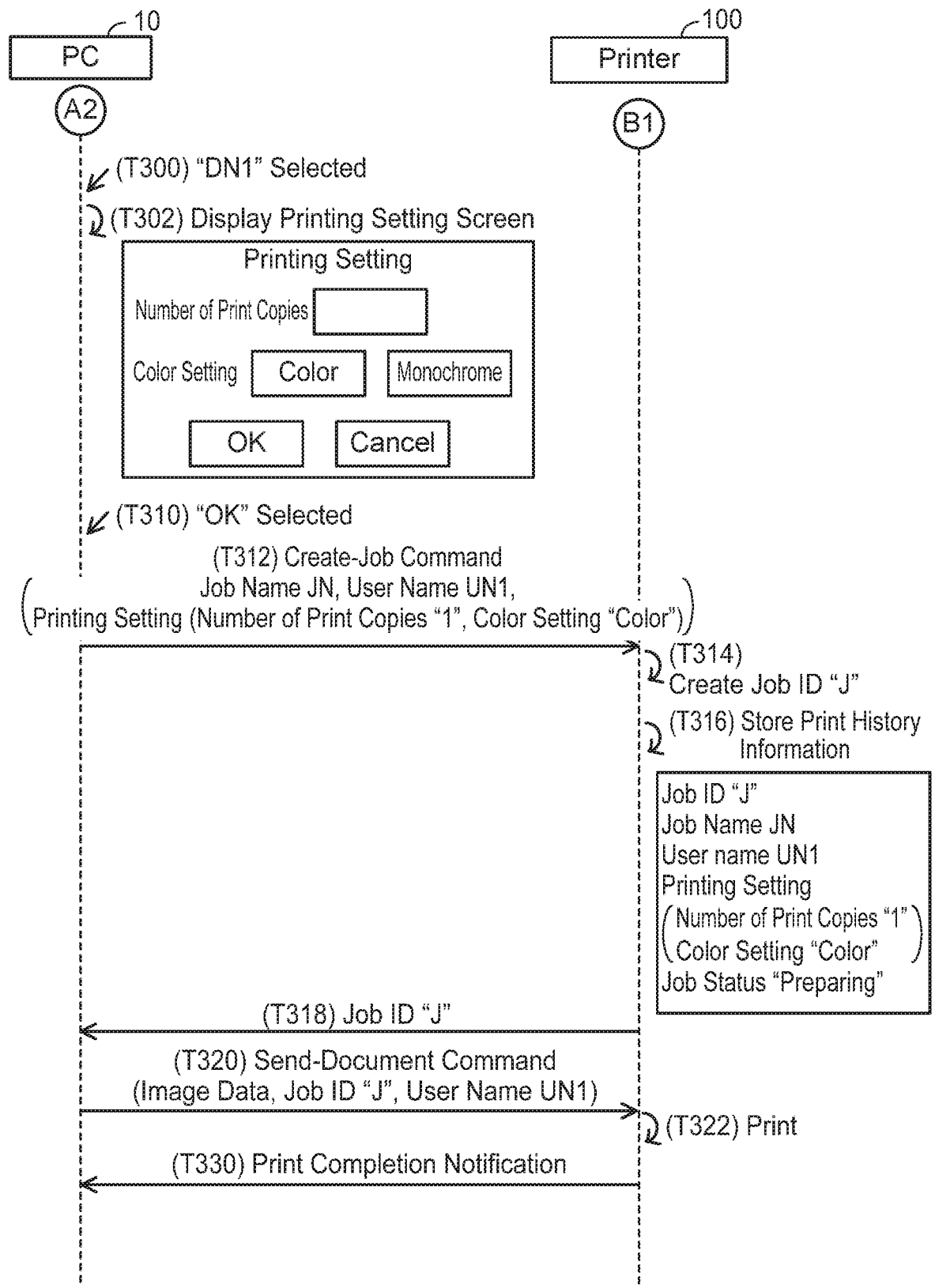
FIG. 7 is a continued sequence diagram of FIG. 6.

(Continuation of FIG. 6; FIG. 7)

Next, continuation of the process of FIG. 6 will be described with reference to FIG. 7. In response to the device name DN1 in the printer selection screen being selected by the first user in T300 after having displayed the printer selection screen on the display unit 14 in T210 of FIG. 6, the PC 10 displays a print setting screen on the display unit 14 in T302 by using the capability information of the printer 100 received in T122 of FIG. 5. Specifically, the PC 10 identifies the two usable items (that is, the number of print copies and the color setting) indicated by the capability information of the printer 100 and displays on the display unit 14 the print setting screen that includes an area for setting a number of print copies which is the print setting corresponding to the usable item "number of print copies", an area for setting a color setting which is the print setting corresponding to the usable item "color setting", an OK button, and a Cancel button.

In T310, the first user sets "1" as the number of print copies and sets "color" as the color setting in the print setting screen, and then selects the OK button. In this case, in T312, the PC 10 sends a Create-Job command according to the IPP (hereinbelow simply termed "CJ command") to the printer 100. The CJ command includes a job name JN which is a name of the image data selected in T110 of FIG. 5, the user name UN1 with which the first user logged in in T5 of FIG. 4, and the print settings set in T310 (that is, the number of print copies "1" and the color setting "color").

When receiving the CJ command from the PC 10 in T312, the printer 100 creates a unique job ID "J" in T314 and stores print history information in T316. This print history information includes the job ID "J" created in T314, the job name JN included in the CJ command, the user name UN1 included in the CJ command, the print settings included in the CJ command (that is, the number of print copies "1" and the color setting "color"), and a job status "preparing" that indicates that the print job has not been executed yet. Then, in T318, the printer 100 sends the job ID "J" created in T314 to the PC 10.

When receiving the job ID "J" from the printer 100 in T318, the PC 10 sends a Send-Document command according to the IPP (hereinbelow simply termed "SD command") to the printer 100 in T320. This SD command includes the image data selected in T110 of FIG. 5, the job ID "J" received in T318, and the user name UN1 with which the first user logged in in T5 of FIG. 4.

When receiving the SD command from the PC 10 in T320, the printer 100 identifies the print history information that includes a job ID "J" which is the same as the job ID "J" included in the SD command and executes printing in T322 according to the image data included in the SD command and the print settings (that is, the number of print copies "1" and the color setting "color") included in the identified print history information. Further, when the printing is completed, the printer 100 changes the job status included in the identified print history information from "executing" to "completed" and sends to the PC 10 in T330 a print completion notification indicating that the printing has been completed. When the process of T330 is completed, the process of FIG. 7 is terminated.

Figure 8:
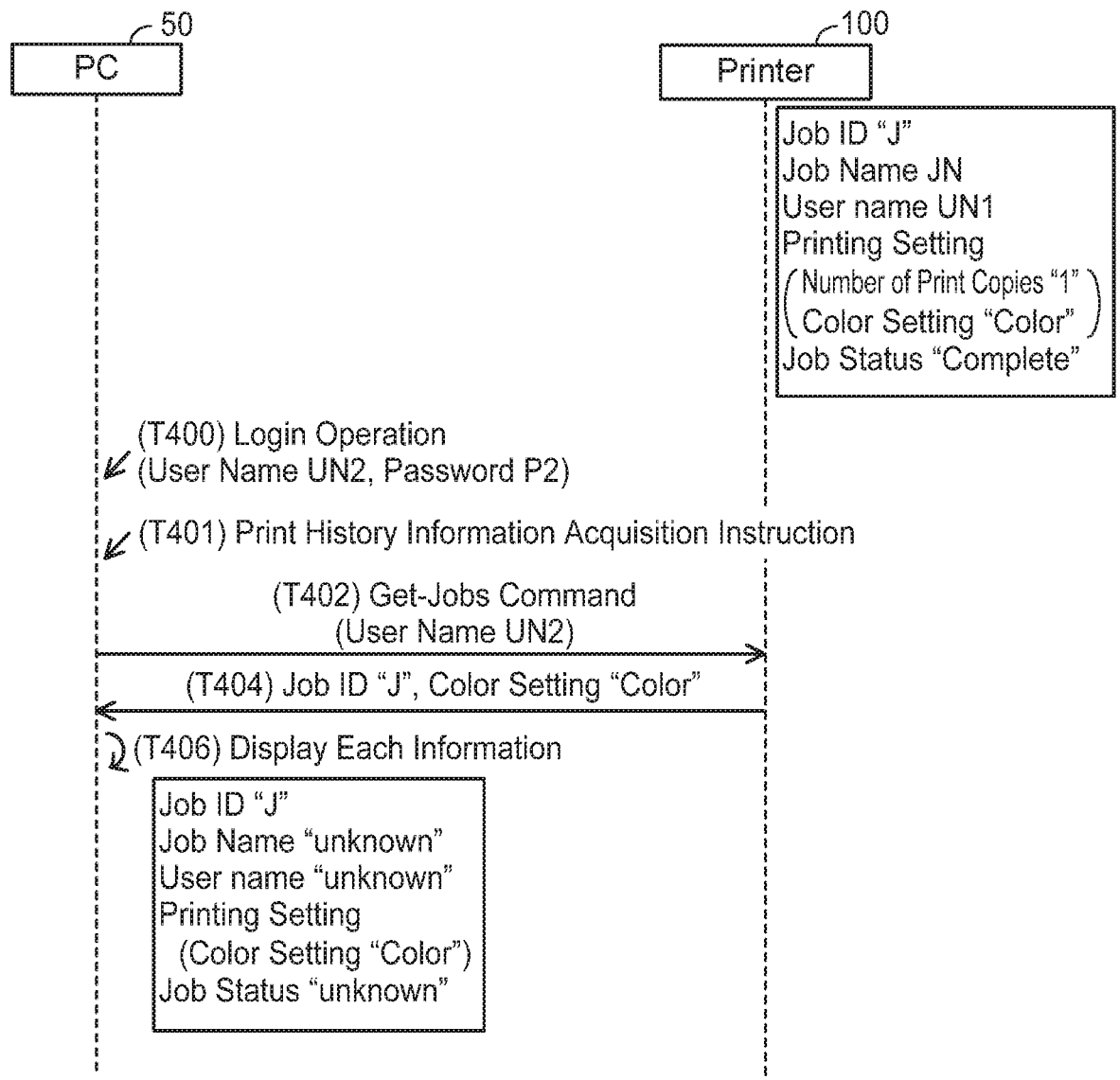
FIG. 8 is a sequence diagram of an acquisition process.

(Acquisition Process; FIG. 8)

Next, an acquisition process of acquiring the print history information from the printer 100 will be described with reference to FIG. 8. FIG. 8 assumes a situation in which the second user attempts to acquire the print history information from the printer 100 by using the PC 50. Further, FIG. 8 assumes a state after the process of FIG. 7 has been executed. As such, in an initial state of FIG. 8, the printer 100 already stores the print history information.

In a case where the PC 50 accepts a login operation including input of the user name UN2 and the password P2 from the second user in T400 and accepts a print history information acquisition instruction that instructs acquisition of the print history information in T401, the PC 50 sends a Get-Jobs command according to the IPP (hereinbelow simply termed "GJ command") to the printer 100 in T402. The GJ command is a command that requests sending of the print history information and includes the user name UN2 with which the second user logged in in T400.

When receiving the GJ command from the PC 50 in T402, the printer 100 determines whether or not the user identified by the user name UN2 included in the GJ command (that is, the second user) is the disclosure target user. Specifically, the printer 100 firstly determines that the disclosure user information indicates "owner", that is, the disclosure target user is limited to the print executing user only. In this case, the printer 100 determines whether the user name UN1 included in the print history information matches the user name UN2 included in the GJ command. In the example of FIG. 8, the printer 100 determines that the two user names do not match, thus determines that the second user is not the print executing user. That is, the printer 100 determines that the second user is not the disclosure target user.

In T404, the printer 100 does not send the print history information (that is, the job name JN, the user name UN1, the job status "completed", and the number of print copies "1") corresponding to the four restriction items (that is, the job name, the user name, the job status, and the number of print copies) indicated by the restriction item information and sends only the other print history information (that is, the job ID "J" and the color setting "color") included in the print history information to the PC 50.

When receiving the job ID "J" and the color setting "color" from the printer 100 in T404, the PC 50 determines that a job name, a user name, and a job status have not been received, and displays the received job ID "J", a character string "unknown" as a job name, a character string "unknown" as a user name, the received color setting "color", and a character string "unknown" as a job status in T406. As a result of this, the print history information that corresponds to the items on which the first user wishes to put disclosure restriction (that is, the job name JN, the user name UN1, the job status "completed", and the number of print copies "1") can be prevented from being acquired by the second user. When the process of T406 is completed, the process of FIG. 8 is terminated.

(Effects of Case A)

The designation item is an item designated by the user of the PC 10 (that is, the first user) in the designation screen, and in other words, it is an item on which the first user wishes to put disclosure restriction. In Case A, in a case where it is determined that the restriction items indicated by the restriction item information of the printer 100 include the designation items (T124 of FIG. 5), that is, in a case where the items on which the first user wishes to put disclosure restriction are stored as the restriction items in the printer 100, the PC 10 displays the printer selection screen that allows selection of the device name DN1 of the printer 100 (T210 of FIG. 6). Then, in response to the device name DN1 in the printer selection screen being selected by the first user (T300 of FIG. 7), the PC 10 sends the CJ command to the printer 100 (T312), receives the job ID "J" from the printer 100 (T318), and sends the SD command to the printer 100 (T320). As a result, printing is executed in the printer 100 (T322) and the print history information is stored therein. On the other hand, in a case where it is determined that the restriction items indicated by the restriction item information of the printer 200 do not include the designation items (T204), that is, in a case where the items on which the first user wishes to put disclosure restrict are not stored as the restriction items in the printer 200, the PC 10 displays the printer selection screen that does not allow selection of the device name DN2 of the printer 200 (T210). As a result, the device name DN2 is not selected in the printer selection screen, so the various commands (that is, the CJ and SD commands) are not sent from the PC 10. As a result of this, due to the various commands not being sent from the PC 10, printing is not executed in the printer 200 and the print history information is not stored therein. As such, the print history information corresponding to the items on which the first user wishes to put disclosure restriction is prevented from being acquired by a user other than the disclosure target user.

In the present embodiment, "disclosure" means that in response to receiving a command that requests sending of print history information (that is, the GJ command) from an external device (such as the PC 10), the printer 100 sends the print history information requested by the command to the external device.

Figure 9:
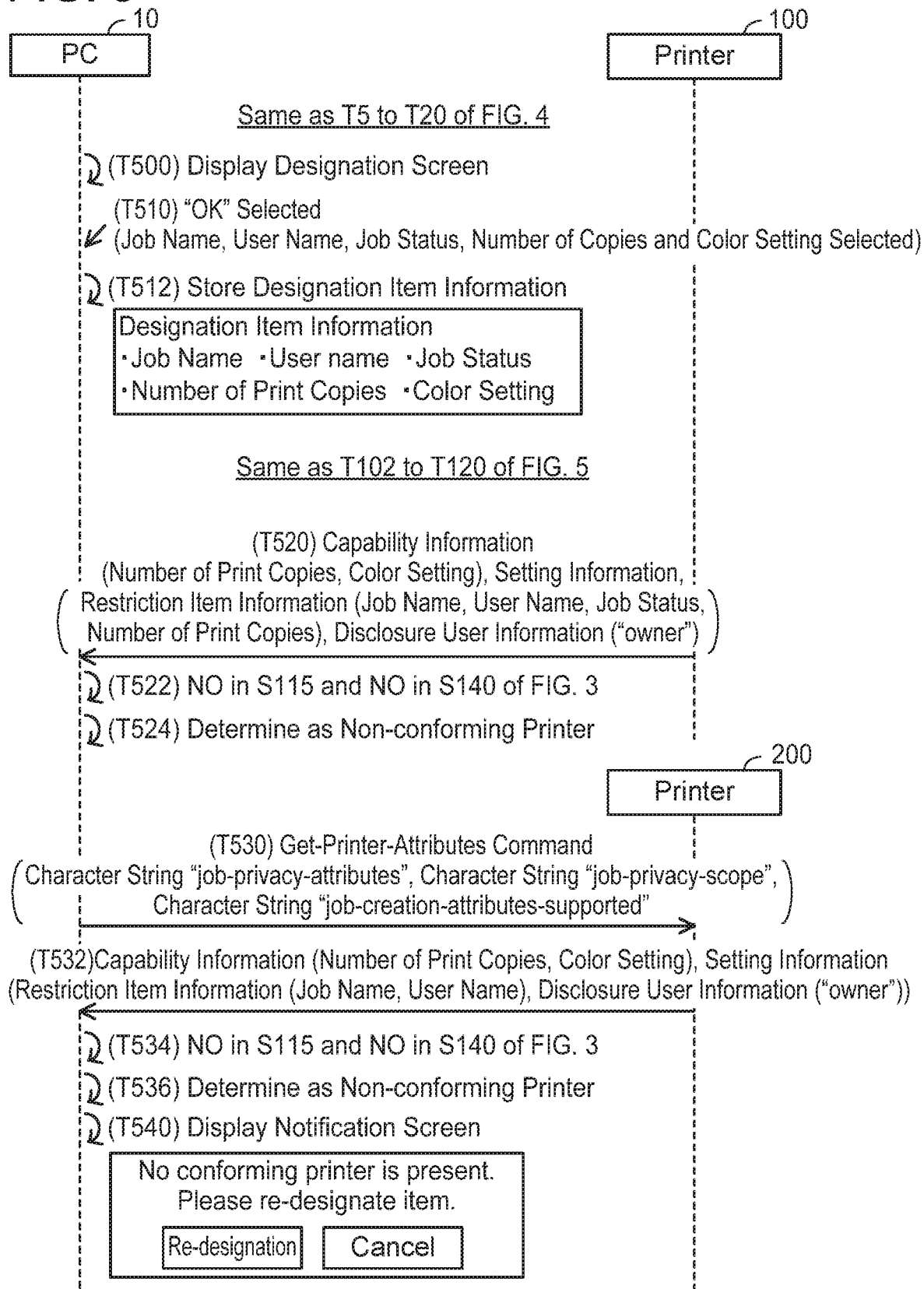
FIG. 9 is a sequence diagram of an item designation process and a print process of Case B.

(Case B; FIG. 9)

Next, an item designation process and a print process in Case B in which there is no printer determined as the conforming printer in the conforming printer determination process will be described with reference to FIG. 9. The PC 10 firstly executes the same processes as T5 to T20 of FIG. 4 and displays the designation screen on the display unit 14 in T500 (S20 of FIG. 2).

In the present case, the first user selects the five checkboxes corresponding to the five item names in the designation screen (that is, the job name, the user name, the job status, the number of print copies, and the color setting) and selects the OK button in T510 (YES in 825 of FIG. 2). In this case, in T512, the PC 10 stores in the memory 34 designation item information that indicates the five designation items (that is, the job name, the user name, the job status, the number of print copies, and the color setting) corresponding to the selected five checkboxes (830).

Then, the same processes as T102 to T120 of FIG. 5 are executed. That is, the PC 10 selects the printer 100 as the target printer and sends the GPA command including the character string "job-privacy-attributes", the character string "job-privacy-scope", and the character string "job-creation-attributes-supported" to the printer 100. Then, in T520, the PC 10 receives the capability information and the setting information of the printer 100 from the printer 100 (S110 of FIG. 3).

In T522, the PC 10 determines that the four restriction items (that is, the job name, the user name, the job status, and the number of print copies) indicated by the restriction item information in the received setting information do not include the five designation items (that is, the job name, the user name, the job status, the number of print copies, and the color setting) indicated by the designation item information stored in the memory 34 (NO in S115 of FIG. 3). Further, the PC 10 determines that the two usable items (that is, the number of print copies and the color setting) indicated by the received capability information include the designation item "color setting" corresponding to print setting (NO in S140).

In this case, the PC 10 determines the printer 100 as the non-conforming printer in T524 (S145).

T530 and T532 are the same as T200 and T202 of FIG. 6. In T534, the PC 10 determines that the three restriction items (that is, the job name, the user name, and the job status) indicated by the restriction item information in the received setting information do not include the five designation items (that is, the job name, the user name, the job status, the number of print copies, and the color setting) indicated by the designation item information stored in the memory 34 (NO in S115 of FIG. 3). Further, the PC 10 determines that the two usable items (that is, the number of print copies and the color setting) indicated by the received capability information include the two designation items corresponding to the print settings (that is, the number of print copies and the color setting) (NO in S140). In this case, the PC 10 determines the printer 200 as the non-conforming printer in T536 (S145), determines that the two sender printers 100, 200 of the response signals have been selected as the target printer (YES in S135), and determines that neither of the two sender printers 100, 200 of the response signals is the conforming printer (NO in S55 of FIG. 2).

In T540, the PC 10 displays the notification screen on the display unit 14. When the process of T540 is completed, the process of FIG. 9 is terminated.

(Effects of Case B)

In Case B, the PC 10 displays the notification screen (T540) in a case of determining that neither of the two sender printers 100, 200 of the response signals is the conforming printer. Due to this, for example, when the first user selects the re-designation button in the notification screen (YES in S80 of FIG. 2), the designation screen is redisplayed (S20), by which the first user can easily designate new designation item(s). As such, user convenience is improved.

(Corresponding Relationships)

The PC 10 and the printer 100 (or 200) are respectively examples of "terminal device" and "target printer". The GPA command in S105 of FIG. 3 is an example of "restriction item request", "usable item request", and "disclosure user information request". The SD command is an example of "print request". The checkboxes in the designation screen are examples of "designation area".

The process of S20 of FIG. 2, the process of S30 of FIG. 2, the process of S105 of FIG. 6, the process of S110 of FIG. 6, the process of S115 of FIG. 6, and the process of S70 of FIG. 2 are respectively examples of "display a designation screen", "store designation item information", "send a restriction item request", "receive the restriction item information", "determine whether the restriction item includes the designation item", and "send a print request".

Figure 10:
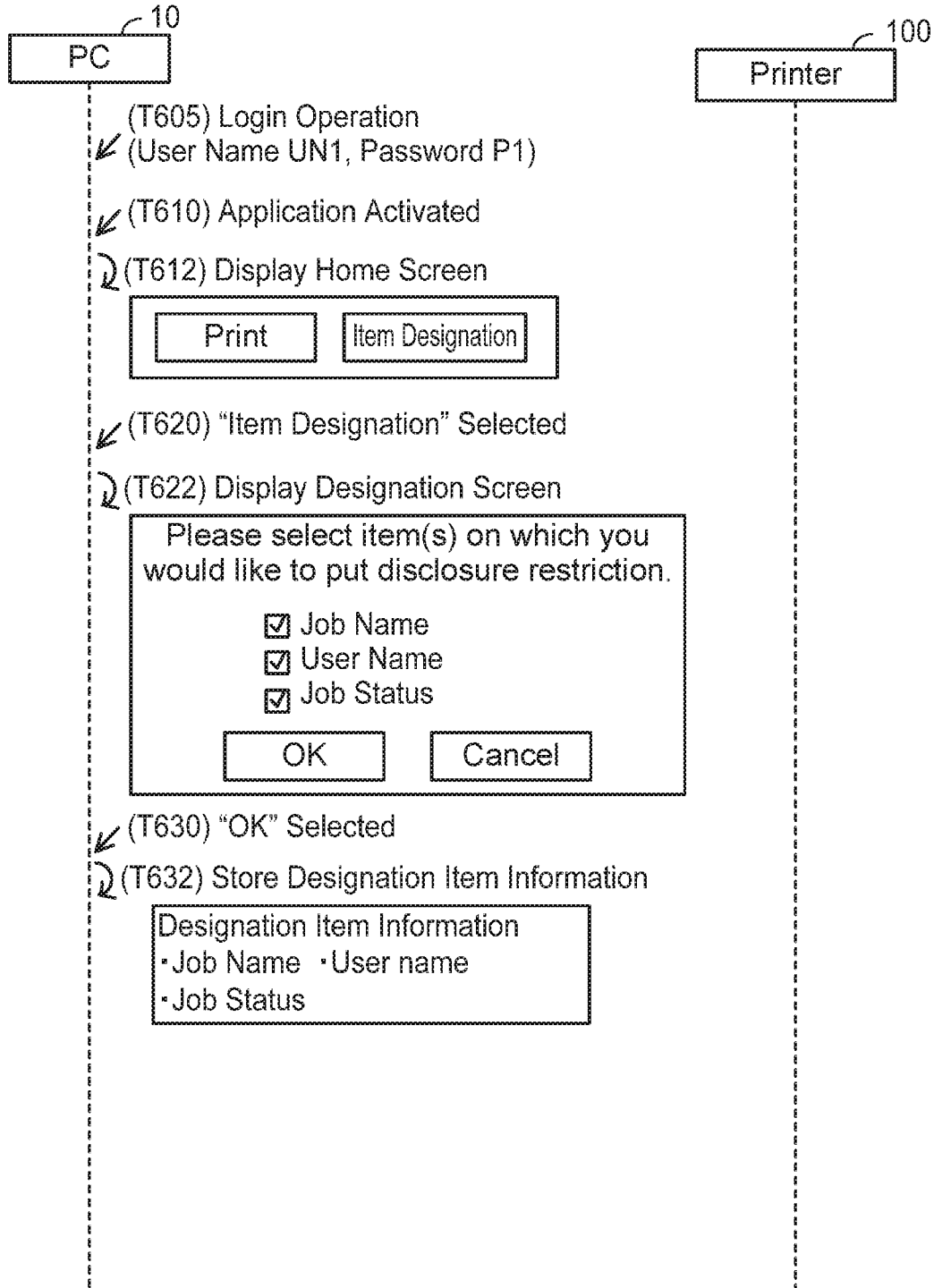
FIG. 10 is a sequence diagram of an item designation process of a second embodiment.
Figure 11:
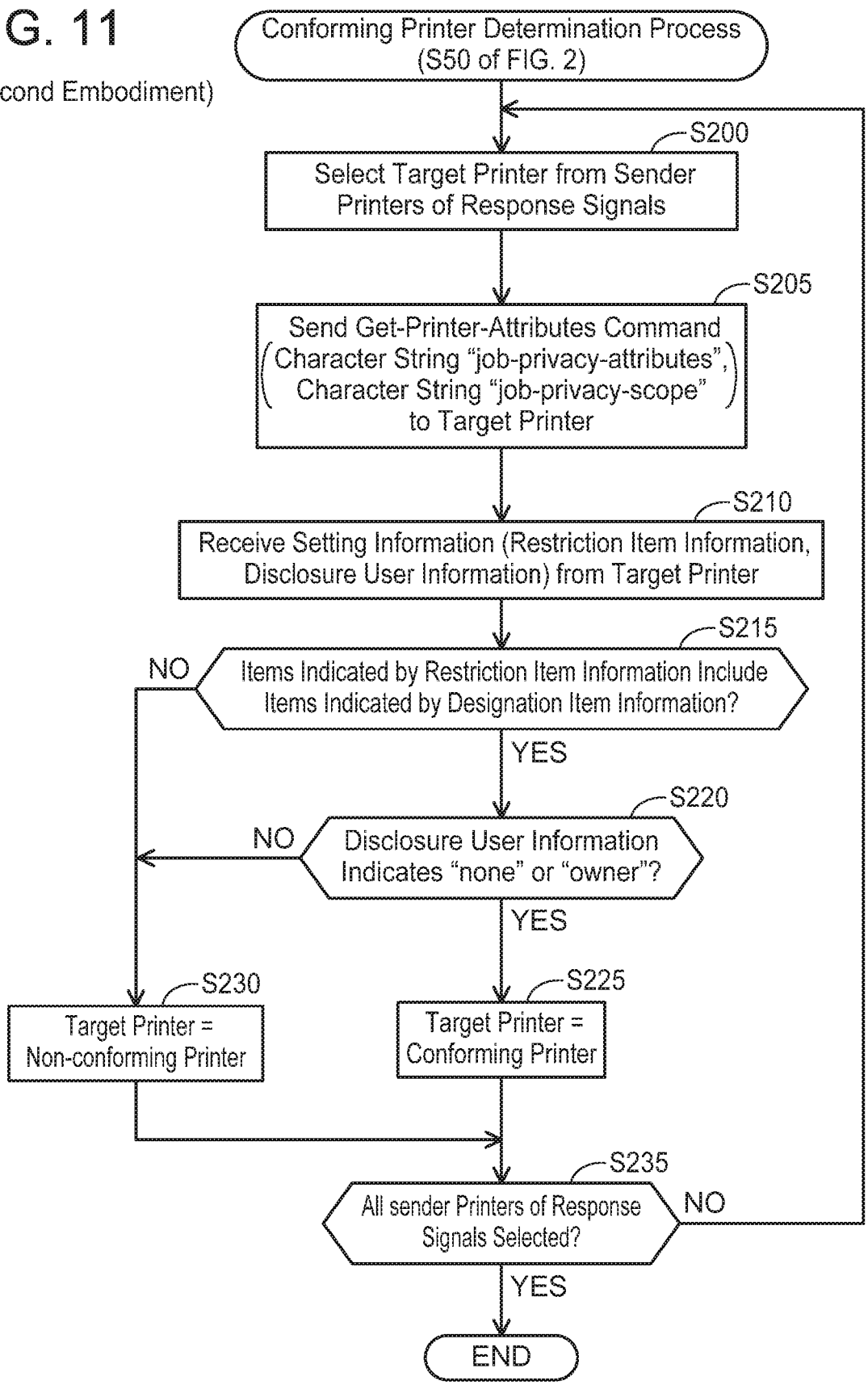
FIG. 11 shows a flowchart of a conforming printer determination process of the second embodiment.

Second Embodiment; FIGS. 10 and 11

Next, a second embodiment will be described with reference to FIGS. 10 and 11. The second embodiment differs from the first embodiment in that the PC 10 displays a designation screen that includes the names of the three items defined as Required in the RFC 8011 (that is, the job name, the user name, and the job status) as well as three checkboxes for designating one or more of these three items but does not include the names of the two items not defined as Required in the RFC 8011 (that is, the number of print copies and the color setting) nor two checkboxes for designating these two items. The second embodiment further differs from the first embodiment in that a conforming printer determination process of FIG. 11 is executed instead of the conforming printer determination process of FIG. 3. Firstly, an item designation process of the second embodiment will be described with reference to FIG. 10. Hereinbelow, the items defined as Required in the RFC 8011 will be termed "required items", and the items not defined as Required in the RFC 8011 will be termed "non-required items".

T605 to T620 are the same as T5 to T20 of FIG. 4. In T622, the PC 10 identifies the three required items (that is, the job name, the user name, and the job status) from among the five items (that is, the job name, the user name, the job status, the number of print copies, and the color setting) indicated by the support information 40 stored in the memory 34, and displays a designation screen on the display unit 14 (S20 of FIG. 2). In the present embodiment, the designation screen includes the names of the identified three required items and three checkboxes for designating these three required items, an OK button, and a Cancel button. The designation screen does not include the names of the two non-required items (that is, the number of print copies and the color setting) among the five items (that is, the job name, the user name, the job status, the number of print copies, and the color setting) indicated by the support information 40 nor two checkboxes for designating these two non-required items.

In T630, the first user selects the three checkboxes corresponding to the names of the three required items (that is, the job name, the user name, and the job status) among the names of the three required items (that is, the job name, the user name, and the job status) in the designation screen and selects the OK button (YES in S25 of FIG. 2). In this case, in T632, the PC 10 stores in the memory 34 designation item information that indicates the three designation items (that is, the job name, the user name, and the job status) corresponding to the selected three checkboxes (S30). When the process of T632 is completed, the process of FIG. 10 is terminated.

(Conforming Printer Determination Process; FIG. 11)

Next, the conforming printer determination process of the second embodiment will be described with reference to FIG. 11. S200 is the same as S100 of FIG. 3.

In S205, the CPU 32 of the PC 10 sends to the target printer a GPA command that includes the character string "job-privacy-attributes" and the character string "job-privacy-scope" but does not include the character string "job-creation-attributes-supported".

In S210, the CPU 32 receives setting information including the restriction item information and the disclosure user information from the target printer.

S215 is the same as S115 of FIG. 3. In a case of determining that the restriction items include the designation items (YES in S215), the CPU 32 determines that the target printer stores the designation items as the restriction item and proceeds to S220. However, in a case of determining that the restriction items do not include the designation items (NO in S215), the CPU 32 determines that the target printer does not store the designation items as the restriction items, determines the target printer as the non-conforming printer in S230, and proceeds to S235. S220 to S235 are the same as S120 to S235. When the process of S235 is completed, the CPU 32 returns to S200.

Effects of Second Embodiment

The second embodiment can also prevent the print history information corresponding to the items on which the first user wishes to put disclosure restriction from being acquired by a user other than the disclosure target user, similar to the first embodiment. Further, in the second embodiment, the PC 10 displays on the display unit 14 the designation screen that includes the names of the three required items (that is, the job name, the user name, and the job status) and the three checkboxes for designating these three required items but does not include the names of the two non-required items (that is, the number of print copies and the color setting) nor the two checkboxes for designating these two non-required items (T622 of FIG. 10). As a result, the first user will never select checkboxes corresponding to the non-required items in the designation screen, thus the printer 10 will not store designation item information that indicates designation item(s) which may not be supported by the target printer. Due to this, the PC 10 does not have to send a GPA command including the character string "job-creation-attributes-supported" to the target printer, receive the capability information from the target printer, and execute the same process as S140 of FIG. 3. As such, processing load on the PC 10 can be reduced as compared to the configuration of the first embodiment.

(Variant 1) In the above embodiments, the print history information has the job-object attribute as its attribute, however, it may have other attribute. The print history information may have a document-object attribute (such as a document ID, a document name) as its attribute. In this case, the support information 40 of the PC 10 indicates item(s) corresponding to information having the document-object attribute as the attribute thereof. Further, the restriction item information of each of the printers 100, 200 has a document-privacy attribute as its attribute, and the disclosure user information thereof has a document-privacy scope attribute as its attribute. Further, in 8105 of FIG. 3, the PC 10 sends to the target printer a GPA command that includes a character string "document-privacy-attributes", a character string "document-privacy-scope", and a character string "job-creation-attributes-supported". In the present variant, the GPA command including the character string "document-privacy-attributes" is an example of "restriction item request", and the GPA command including the character string "document-privacy-scope" is an example of "disclosure user information request".

(Variant 2) The processes of S60 and S65 of FIG. 2 may be omitted. In this case, the PC 10 may select, for example, one printer that is located closest to the PC 10 from among the conforming printers without accepting an operation from the first user, communicate with this printer to execute printing according to the IPP, and cause this printer to execute printing. In the present variant, "display a printer selection screen" may be omitted.

(Variant 3) The processes of S75 and S80 may be omitted. In this case, the PC 10 returns to S10 in the case of determining NO in S55. In the present variant, "redisplay the designation screen" may be omitted.

(Variant 4) In S105 of FIG. 3, the PC 10 may send to the target printer a GPA command that includes the character string "job-privacy-attributes" and the character string "job-creation-attributes-supported" but does not include the character string "job-privacy-scope". In this case, in S110, the PC 10 receives the capability information and the restriction item information from the target printer. Further, in the case of determining YES in S115, the PC 10 skips the process of S120 and determines the target printer as the conforming printer in S125. In the present variant, "send a disclosure user information request", "receive the disclosure user information", and "determine whether the received disclosure user information satisfies a predetermined condition" may be omitted.

(Variant 5) In S120, the PC 10 may determine whether or not the disclosure user information indicates "default", for example. That is, "predetermined condition" may voluntarily be set.

(Variant 6) In the above embodiments, the processes of FIGS. 2 to 11 are realized by the CPU 32 of the PC 10 executing the OS program 36 and the app 38 in the memory 34. Instead of this, at least one of these processes may be realized by hardware such as a logic circuit.

What is claimed is:

1. A non-transitory computer-readable recording medium storing computer-readable instructions for a terminal device,
wherein the computer-readable instructions, when executed by a processor of the terminal device, cause the terminal device to:
display a designation screen on a display unit of the terminal device;
store designation item information indicating a designation item in a memory of the terminal device,
wherein the designation item is an item that is designated by a user of the terminal device on the displayed designation screen from among a plurality of items corresponding to print history information, and
the print history information is information that is stored in a target printer in response to printing according to an Internet Printing Protocol (IPP) being executed in the target printer;
send a restriction item request to the target printer, wherein the restriction item request is according to the IPP and requests sending of restriction item information indicating a restriction item, and the restriction item is among the plurality of items corresponding to the print history information and is stored in the target printer as an item of which disclosure to a user other than a disclosure target user is restricted;
in a case where the restriction item request is sent to the target printer, receive the restriction item information from the target printer;
determine whether the restriction item indicated by the received restriction item information includes the designation item indicated by the designation item information stored in the memory; and
in a case where it is determined that the restriction item includes the designation item, send a print request that requests execution of printing according to the IPP to the target printer, wherein in a case where it is determined that the restriction item does not include the designation item, the print request is not sent,
wherein in the target printer, in a case where the print request is received from the terminal device, the printing according to the IPP is executed and the print history information is stored, and
in the target printer, the printing according to the IPP is not executed and the print history information is not stored due to the print request being not sent from the terminal device.

2. The non-transitory computer-readable recording medium as in claim 1, wherein
the designation screen includes a designation area for designating the designation item from among one or more specific items, the designation area indicating names of the one or more specific items interpretable by the terminal device, and
the one or more specific items are a part of the plurality of items defined by the IPP.

3. The non-transitory computer-readable recording medium as in claim 2, wherein
the one or more specific items are defined as Required in Request For Comments (RFC) 8011.

4. The non-transitory computer-readable recording medium as in claim 3, wherein
in a case where a print job according to a print request is executed in the target printer, the print history information is stored in the target printer,
the part of the plurality of items includes at least one of an item corresponding to a name of the print job, an item corresponding to an execution status of the print job and an item corresponding to a name of a user who instructed execution of printing.

5. The non-transitory computer-readable recording medium as in claim 1, wherein
the computer-readable instructions, when executed by the processor, further cause the terminal device to:
send a usable item request to the target printer, wherein the usable item request is according to the IPP and requests sending of usable item information indicating a usable item that the target printer is capable of using;
in a case where the usable item request is sent to the target printer, receive the usable item information from the target printer;
determine whether the usable item indicated by the received usable item information includes the designation item indicated by the designation item information stored in the memory; and
in a case where it is determined that the restriction item does not include the designation item and it is determined that the usable item does not include the designation item, send the print request to the target printer,
wherein in a case where it is determined that the usable item includes the designation item, the print request is not sent.

6. The non-transitory computer-readable recording medium as in claim 1, wherein
the computer-readable instructions, when executed by the processor, further cause the terminal device to:
in the case where it is determined that the restriction item includes the designation item, display a printer selection screen on the display unit, the printer selection screen allowing the target printer to be selected as a printer that is to execute printing, wherein in the case where it is determined that the restriction item does not include the designation item, the printer selection screen does not allow the target printer to be selected as a printer that is to execute printing.

7. The non-transitory computer-readable recording medium as in claim 1, wherein
the restriction item request is sent to each of one or more printers including the target printer,
the restriction item information is received from each of the one or more printers,
for each of the one or more printers, it is determined whether the restriction item indicated by the received restriction item information includes the designation item indicated by the designation item information stored in the memory,
wherein the computer-readable instructions, when executed by the processor, further cause the terminal device to:

in a case where it is determined that none of the restriction items of the one or more printers includes the designation item, redisplay the designation screen on the display unit.

8. The non-transitory computer-readable recording medium as in claim 1, wherein
the computer-readable instructions, when executed by the processor, further cause the terminal device to:
send a disclosure user information request to the target printer, wherein the disclosure user information is according to the IPP and requests sending of disclosure user information, and the disclosure user information indicates the disclosure target user of the restriction item;
in a case where the disclosure user information request is sent to the target printer, receive the disclosure user information from the target printer; and
determine whether the received disclosure user information satisfies a predetermined condition,
wherein in a case where it is determined that the restriction item includes the designation item and it is determined that the disclosure user information satisfies the predetermined condition, the print request is sent to the target printer, and
in a case where it is determined that the restriction item includes the designation item and it is determined that the disclosure user information does not satisfy the predetermined condition, the print request is not sent.

9. The non-transitory computer-readable recording medium as in claim 8, wherein
in a case where the disclosure user information indicates owner, the predetermined condition is satisfied,
in a case where the disclosure user information indicates none, the predetermined condition is satisfied, and
in a case where the disclosure user information indicates different information from the owner and the none, the predetermined condition is not satisfied.

10. A method executed by a terminal device, the method comprising:
displaying a designation screen on a display unit of the terminal device;
storing designation item information indicating a designation item in a memory of the terminal device,
wherein the designation item is an item that is designated by a user of the terminal device on the displayed designation screen from among a plurality of items corresponding to print history information, and
the print history information is information that is stored in a target printer in response to printing according to an Internet Printing Protocol (IPP) being executed in the target printer;
sending a restriction item request to the target printer, wherein the restriction item request is according to the IPP and requests sending of restriction item information indicating a restriction item, and the restriction item is among the plurality of items corresponding to the print history information and is stored in the target printer as an item of which disclosure to a user other than a disclosure target user is restricted;
in a case where the restriction item request is sent to the target printer, receiving the restriction item information from the target printer;
determining whether the restriction item indicated by the received restriction item information includes the designation item indicated by the designation item information stored in the memory; and
in a case where it is determined that the restriction item includes the designation item, sending a print request that requests execution of printing according to the IPP to the target printer, wherein in a case where it is determined that the restriction item does not include the designation item, the print request is not sent,
wherein in the target printer, in a case where the print request is received from the terminal device, the printing according to the IPP is executed and the print history information is stored, and
in the target printer, the printing according to the IPP is not executed and the print history information is not stored due to the print request being not sent from the terminal device.

11. The method as in claim 10, wherein
the designation screen includes a designation area for designating the designation item from among one or more specific items, the designation area indicating names of the one or more specific items interpretable by the terminal device, and
the one or more specific items are a part of the plurality of items defined by the IPP.

12. The method as in claim 11, wherein
the one or more specific items are defined as Required in Request For Comments (RFC) 8011.

13. The method as in claim 12, wherein
in a case where a print job according to a print request is executed in the target printer, the print history information is stored in the target printer,
the part of the plurality of items includes at least one of an item corresponding to a name of the print job, an item corresponding to an execution status of the print job and an item corresponding to a name of a user who instructed execution of printing.

14. The method as in claim 10, wherein the method further comprising:
sending a usable item request to the target printer, wherein the usable item request is according to the IPP and requests sending of usable item information indicating a usable item that the target printer is capable of using;
in a case where the usable item request is sent to the target printer, receiving the usable item information from the target printer;
determining whether the usable item indicated by the received usable item information includes the designation item indicated by the designation item information stored in the memory; and
in a case where it is determined that the restriction item does not include the designation item and it is determined that the usable item does not include the designation item, sending the print request to the target printer,
wherein in a case where it is determined that the usable item includes the designation item, the print request is not sent.

15. The method as in claim 10, wherein the method further comprising:
in the case where it is determined that the restriction item includes the designation item, displaying a printer selection screen on the display unit, the printer selection screen allowing the target printer to be selected as a printer that is to execute printing, wherein in the case where it is determined that the restriction item does not include the designation item, the printer selection screen does not allow the target printer to be selected as a printer that is to execute printing.

16. The method as in claim 10, wherein
the restriction item request is sent to each of one or more printers including the target printer,
the restriction item information is received from each of the one or more printers,
for each of the one or more printers, it is determined whether the restriction item indicated by the received restriction item information includes the designation item indicated by the designation item information stored in the memory,
wherein the method further comprising:
in a case where it is determined that none of the restriction items of the one or more printers includes the designation item, redisplaying the designation screen on the display unit.

17. The method as in claim 10, wherein the method further comprising:
sending a disclosure user information request to the target printer, wherein the disclosure user information is according to the IPP and requests sending of disclosure user information, and the disclosure user information indicates the disclosure target user of the restriction item;
in a case where the disclosure user information request is sent to the target printer, receiving the disclosure user information from the target printer; and
determining whether the received disclosure user information satisfies a predetermined condition,
wherein in a case where it is determined that the restriction item includes the designation item and it is determined that the disclosure user information satisfies the predetermined condition, the print request is sent to the target printer, and
in a case where it is determined that the restriction item includes the designation item and it is determined that the disclosure user information does not satisfy the predetermined condition, the print request is not sent.

18. The method as in claim 17, wherein
in a case where the disclosure user information indicates owner, the predetermined condition is satisfied,
in a case where the disclosure user information indicates none, the predetermined condition is satisfied, and
in a case where the disclosure user information indicates different information from the owner and the none, the predetermined condition is not satisfied.

19. A terminal device comprising:
a display unit;
a processor; and
a memory storing computer-readable instructions therein, the computer-readable instructions, when executed by the processor, causing the terminal device to:
display a designation screen on the display unit;
store designation item information indicating a designation item in the memory,
wherein the designation item is an item that is designated by a user of the terminal device on the displayed designation screen from among a plurality of items corresponding to print history information, and
the print history information is information that is stored in a target printer in response to printing according to an Internet Printing Protocol (IPP) being executed in the target printer;
send a restriction item request to the target printer, wherein the restriction item request is according to the IPP and requests sending of restriction item information indicating a restriction item, and the restriction item is among the plurality of items corresponding to the print history information and is stored in the target printer as an item of which disclosure to a user other than a disclosure target user is restricted;
in a case where the restriction item request is sent to the target printer, receive the restriction item information from the target printer;
determine whether the restriction item indicated by the received restriction item information includes the designation item indicated by the designation item information stored in the memory; and
in a case where it is determined that the restriction item includes the designation item, send a print request that requests execution of printing according to the IPP to the target printer, wherein in a case where it is determined that the restriction item does not include the designation item, the print request is not sent,
wherein in the target printer, in a case where the print request is received from the terminal device, the printing according to the IPP is executed and the print history information is stored, and
in the target printer, the printing according to the IPP is not executed and the print history information is not stored due to the print request being not sent from the terminal device.

* * * * *